United States Patent [19]

Morton

[11] 4,069,411

[45] Jan. 17, 1978

[54] IMAGE ANALYSIS SYSTEM AND METHOD FOR MINIMIZING PARALYSIS ANGLE

[75] Inventor: Roger R. Morton, Penfield, N.Y.

[73] Assignee: Bausch & Lomb Incorporated, Rochester, N.Y.

[21] Appl. No.: 699,551

[22] Filed: June 24, 1976

Related U.S. Application Data

[60] Continuation-in-part of Ser. No. 636,273, Nov. 28, 1975, which is a continuation of Ser. No. 434,529, Jan. 18, 1974, abandoned, which is a division of Ser. No. 210,278, Dec. 20, 1971, Pat. No. 3,805,028, which is a continuation of Ser. No. 835,673, June 23, 1969, abandoned.

[51] Int. Cl.$^2$ ............................................. G06M 11/02
[52] U.S. Cl. ............................ 235/92 PC; 235/92 R; 340/146.3 AE
[58] Field of Search .................. 235/92 PC; 358/107; 340/164.3 AE

[56] References Cited

U.S. PATENT DOCUMENTS 3,619,494  11/1971  Fisher .............................. 235/92 PC Primary Examiner—Joseph M. Thesz
Attorney, Agent, or Firm—Frank C. Parker; Bernard D. Bogdon

[57] ABSTRACT

A system and method of counting and analyzing each image of a plurality of features by minimizing the paralysis angle associated with each feature whose image is being analyzed by line-to-line scanning techniques is disclosed. The system and method involves the temporary storage of the X-coordinates of the boundary intercepts of each feature along one line scan and then selecting the last-to-occur of such intercepts to generate in memory a modified binary video signal to define the trailing edge of the feature. The modified video signal is stored one line scan and compared with the next real time line scan video signal in a manner such that the trailing edge data very accurately represents the actual position of the trailing edge of the feature.

11 Claims, 7 Drawing Figures

IMAGE ANALYSIS SYSTEM AND METHOD FOR MINIMIZING PARALYSIS ANGLE

BACKGROUND OF THE INVENTION

This application is a continuation-in-part of U.S. Pat. Application Ser. No. 636,273, filed Nov. 28, 1975, which is a continuation of U.S. Pat. appliction Ser. No. 434,529, file Jan. 18, 1974 (now abandoned), which is a division of U.S. Pat. application Ser. No. 210,278, filed Dec. 20, 1971 (now U.S. Pat. No. 3,805,028), the latter being a continuation of U.S. Ser. No. 835,673, filed June 23, 1969 (now abandoned).

BRIEF DESCRIPTION OF PRIOR ART

The processing of video signals generated from a parallel scan line format to extract counting, measurement and shape data has been documented in various patents. An example of this work is disclosed in U.S. Pat. No. 3,805,028 for inventor R. A. Morton the disclosure of which is incorporated herein by reference. In that patent, a variety of line-to-line scanning techniques are described which are employed to extract counting and measurement information pertinent to features under analysis from their image. Another patent which relates to such techniques in U.S. Pat. No. 3,619,494 or inventor C. Fisher.

One disadvantage of previous counting techniques includes not correctly counting features of all shapes. If systems do correctly count features of all shapes, certain closely spaced features are frequently counted as one feature by the electronic counting logic, even though such features may be convex in shape and shadow a second distinct feature.

The prior art discloses that quantitative data may be extracted from images of objects by first generating a video signal representing the image using a television camera or similar device. These objects, generally termed features, may be particles imaged under a microscope onto the television camera, inclusions in a metallurgical specimen, or any other object which may be imaged, for which a measurement is desired. Generation of the binary video signal which defines the boundaries of the features is achieved using techniques outlined in the above mentioned Morton U.S. Pat. No. 3,805,028.

The video signal is next processed to determine the position within the field of view of the boundaries of the objects or features to be analyzed and measured. The generated binary video signal is further processed to extract the desired count or measurement information. This processing, generally termed digital analysis, takes place at a rate synchronous with the generation of the signal, in order to avoid the necessity of storing the entire image or all the image data prior to processing. The processing involves line-to-line storage in that the binary video signal of a previous line scan is delayed one line scan for comparison with the binary video signal of a current line scan to eventually provide a count pulse for each feature.

Thus, as long as the comparison shows an overlap of intercept data for a feature in both the delayed and current binary video signal, the feature is treated as still being traversed by the scanning beam. However, when overlapping feature data is absent from a current binary video signal, but is present in the delayed binary video signal, it is inferred that the feature is no longer being tranversed by the scanning beam and is so treated. Such lack of coincidence can be used to generate a count pulse.

A convenient way to implement the line-to-line storage is by a fixed length delay line or a shift register memory which produces a time delay equal in duration to the time it takes the raster scan to execute one complete scan line cycle. The fixed delay technique is limited by the fact that consecutive intercepts of the scan line on a given feature do not necessarily lie in the same position from one scan line to the next. Consequently, while delayed data generated on a previous scan line will generally occur near the intercept of the next scan line of the feature for which it was generated, features of certain shapes and certain boundary directions which demonstrate a lack of exact correspondence from line to line, may cause a serious limitation in the performance of the instrument.

For example, the system disclosed at FIG. 20 of the above-referenced Morton patent can result, under certain circumstances, in the counting of two adjacent particles as one, as indicated in FIG. 1 of the drawings of this disclosure. Thus, the analysis system accounts for particles B and C, and particles E and F, respectively, as one and counts each pair as one feature, as noted, for example, by count tag 12 and 14. This is due to the paralysis of the system in the area D. In this connection, the angle "PA" is termed the paralysis angle. The paralysis angle can be defined as the angle between a horizontal line such as a scan line and a line drawn from the trailing edge of a feature, such that if another feature lies between the boundary of the feature and the line which extends from the feature, the other feature will be treated by the analysis logic as if it is part of the first feature.

One approach to reduce the paralysis angle for insuring all features are counted is to shorten the length of the delay line so that the data coming from the delay line memory is available before or soon after the occurrence of the intercept on the next scan line. This solution acting as an advantage one way, however, degrades the resolution of the system and its ability to analyze small or closely spaced features.

Indexing techniques to store data may also be implemented. Examples include assigning a location in random access memory or other discrete cell memory, which is specific to the feature being measured. This technique has been disclosed in U.S. Pat. No. 3,390,229 or inventor D. A. Williams where discrete registers are used for line-to-line memory. Each register is assigned to a specific feature until the scan of that feature is complete. This technique demands a particularly complex control logic to perform the assignment of memory locations, detecting when memory locations are no longer needed for a specific feature, and which ones may be reassigned as required.

SUMMARY OF THE INVENTION

The system and method employed herein preferably involves the temporary storage of positional data representative of the X-coordinate of the locations of the intercepts of a scanning beam with a feature image. The data representative of the first leading edge intercept and the last trailing edge intercept is then selected and a modified video signal is generated in memory corresponding to these selected data. This signal is stored one line scan and is then compared with the binary video signal of a current line scan.

For example, a reentrant feature G is shown in FIG. 2. During line scan n, positional data for intercept points 1, 2, 3 and 4 is temporarily stored, for example, in either counter 706 or 707 as illustrated in FIG. 7, but only data for intercept points 1 and 4 is used to define the modified binary signal which is to be delayed. However, on the line scan $n+1$, positional data for intercept points 5 and 6 is stored and in this case that data is used to define the next binary signal which is to be delayed. Hence, it can be seen that the paralysis angle for this particular example is essentially zero. If a second particle H is positioned as in FIG. 2, it will be counted as a separate particle.

This invention ensures that features of any shape are counted correctly and that features which are convex, if separated within the resolution limits of the system, are always counted as individual features. Furthermore, even for features which have re-entrances, the limitations regarding the spacing these features must have in order to be correctly counted, are greatly reduced.

The phenomenon of "feature break-up" in image analysis is recognized by those skilled in the art as undesirable when making oversize counts. "Feature break-up" is usually defined as a condition which occurs when a feature generates more than one count at a given oversize setting. This invention provides a system and method which avoids "feature break-up" when operating in the oversize count mode.

DESCRIPTION OF PREFERRED EMBODIMENT

Figure 4:
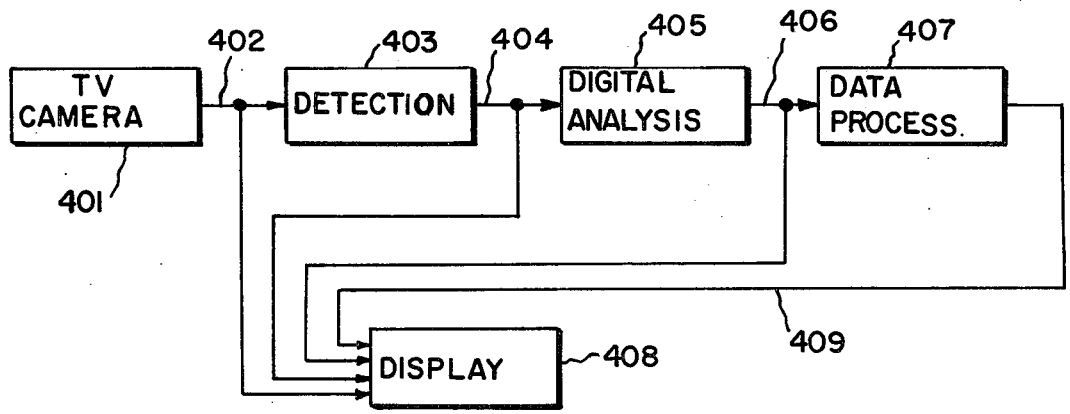
FIG. 4 shows the major elements of an image analysis system in a block diagram form.

The elements of an image analysis system have been described in the before mentioned Morton U.S. Pat. No. 3,805,028 the disclosure of which is incorporated herein by reference. For convenience and for completeness in this specification, FIG. 4 shows the major elements of an image analysis system in a block diagram form. The image to be measured or analyzed is viewed by television camera 401 to generate a video signal on line 402 representing the image. This video signal is then analyzed in detection circuit 403 to define the boundary of the feature to be analyzed. The signal representing the boundary is termed the binary video signal and appears on line 404. This signal then passes to the digital analysis block 405, referred to in greater detail in FIG. 5, which processes the signal to produce the desired count data, the results of which pass along line 406 to a data processing function 407.

Figure 1:
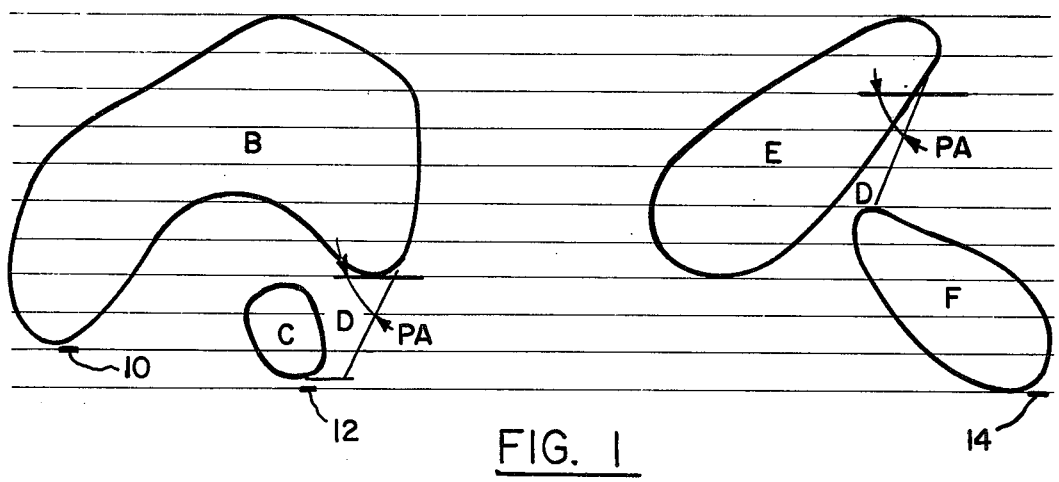
FIG. 1 illustrates certain particles or features scanned and analyzed in accordance with the prior art in which there is a substantial paralysis angle.

Specifically, in the case of counting operations, the data on line 406 corresponds to count tags assigned to specific features. The video signal also passes to the display 408 to display the image viewed by the television camera, as well as the detected image of the boundary of the feature or features to be measured, the count tags on line 406, and the results of the measurement in the count register, on line 409, to be presented on the display. Count tags can be visually represented, for example, by tags 10 and 12 of FIG. 1.

Figure 5:
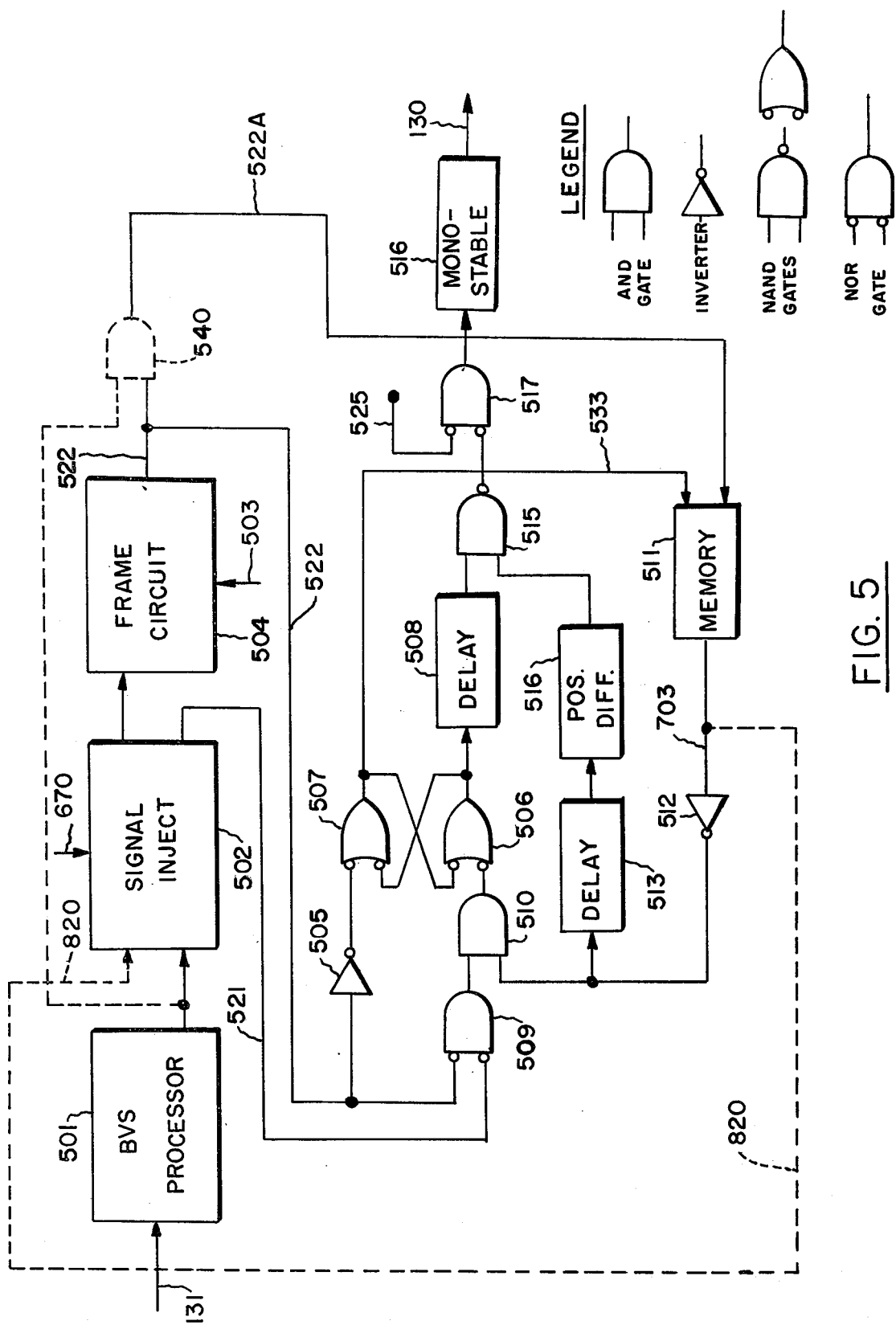
FIG. 5 shows a combined block and logic diagram of the digital analysis circuit shown in FIG. 4.

Of specific interest in the current invention is the digital analysis block 405, which is shown in greater detail in FIG. 5. The function of the count circuit, shown in FIG. 5 is to produce one pulse on output line 130 for each feature in the field, in response to data consisting primarily of the incoming binary video signal on line 131. The binary video signal enters the binary video signal pre-processor 501, which processes the binary video signal so that transitions of the binary video signal are not closer than the timing resolution of the subsequent circuitry.

Figure 6:
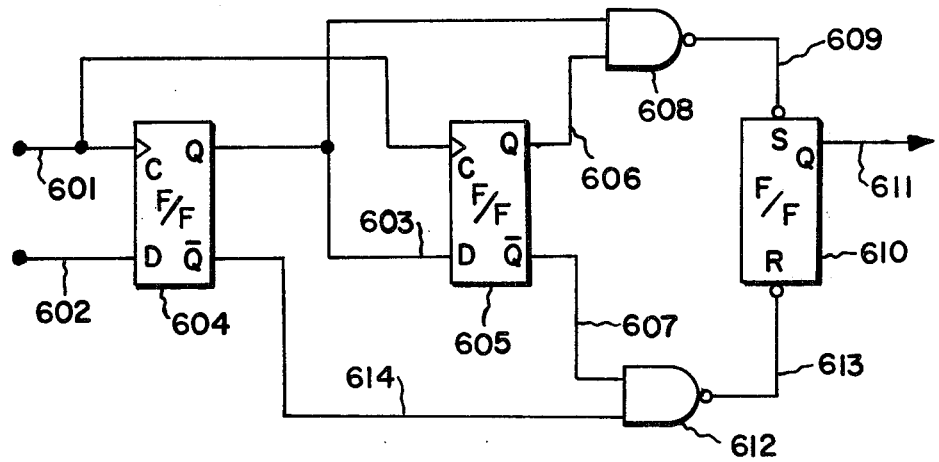
FIG. 6 shows a circuit for use as a part of this invention in the scanning of very narrow features.

Thus, in some cases, very narrow features oriented substantially transversely to the new format are scanned and produce leading and trailing edge signals so close together that the system cannot resolve them and these signals appear to the system as one signal. This can cause all the remaining edge signals of that scan line to be out-of-phase. To avoid this, the select circuit of FIG. 6 is incorporated to implement the function of pre-processor 501 and operates on such signals to cause closely spaced leading and trailing edge signals to be ignored. Therefore, all signals which are spatially so close that they cannot be resolved, are not considered.

The circuit to do this can comprise, as shown in FIG. 6, two flip-flops synchronously clocked, for example, at a 20 MHz rate, by a clocking signal on line 601 generated from a system clock. Flip-flops 604 and 605 are of the D-type and can be, for example, Texas Instruments component SN74S74. The flip-flops receive the incoming video signal on line 602 and a clock signal on line 601. Flip-flop 604 produces a binary video signal on line 603 identical to the incoming binary video signal except that it is delayed by one clock pulse. Flip-flop 605, in response to the signal on line 603, produces a signal, similar to the binary video signal but delayed by a further clock pulse, on output line 606 and its inverted form on output line 607. NAND gate 608, through line 609, sets set/reset flip-flop 610 whenever flip-flops 604 and 605 are in the set or "1" state. Similarly, NAND gate 612, in receipt of the inverted signal on line 607 and a signal on line 614 which is the invert of the signal on line 603, produces an output on line 613 to reset flip-flop 610 whenever flip-flops 604 or 605 are in the reset or "0" state. Thus, the output of the flip-flop 610 on line 611 corresponds to the incoming binary video on line 601, except that transitions closer than two clock pulses apart do not occur. The flip-flop 610 can comprise, for example, Texas Instruments component SN74S74. The NAND gates 608 and 612 can comprise Texas Instrument component SN74SOO.

With respect to FIG. 5, the function of optional circuit 502 is to inject signals corresponding to the oversize count as in gates 5802 and 5803 of FIG. 20 of the before mentioned Morton U.S. Pat. No. 3,805,028, when the circuit is in the oversize count mode. As a consequence of this, circuit line 521 is in the low state when in the count mode, and corresponds to the inverted signal when the system is in the oversize count mode.

The frame circuit 504 is associated with border correction in the counting operation, and can be implemented in the same manner as the half-frame inject circuit 5804 of FIG. 20 of the before mentioned Morton patent. In the alternative, it can simply be implemented by modification of the incoming binary video signal on line 131 to inhibit the binary video signal entering from the signal inject circuit 502 when it corresponds to areas outside the field of view by combining the binary video signal with the blanking signal from line 503 generated by the television camera in an AND gate driving line 522. When the system is in the count mode line 522A is a direct connection to line 522. Thus, on line 522, the pre-processed binary video, processed for border correction, passes to the count logic gate 505 to set the set/reset flip-flop comprising gates 506 and 507 whenever the binary video signal on line 522 goes to the "1" or high state, corresponding to the leading edge intercept of a feature.

Line 521 can be ignored and assumed to be low, except in the oversize count mode. Consequently set/reset flip-flop comprised of gates 506 and 507 resets when line 522 is low, or in the "0" state, corresponding to being outside the feature intercept, and when the output on line 703 from the line-to-line memory 511 is also low, to produce a high or "1" value signal at the output of inverter 512. This in combination, produces a low signal at the output of gate 510 to reset the flip-flop comprised of gates 506 and 507. Thus, the flip-flop comprised of gates 506 and 507 is set whenever line 522 is high, and reset whenever both line 522 and the output line 703 of line-to-line memory 511 are low.

Figure 2:
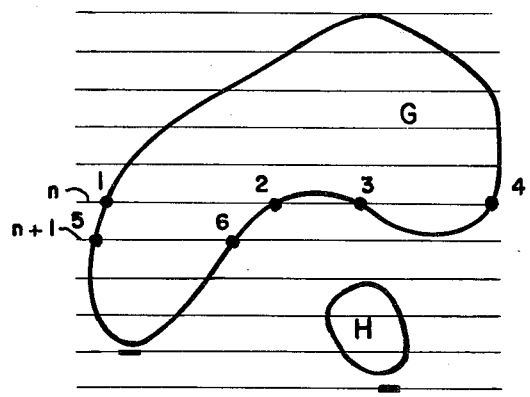
FIG. 2 is an illustration of particles or features being scanned and analyzed in accordance with this invention with the scanning information being processed in a manner to minimize and substantially eliminate the paralysis angle.

In operation, the one line scan delayed binary video signal from memory 511, which may have resulted from a modified video signal as for reentrant feature G as shown in FIG. 2, is combined with the current binary video signal of the next line scan on line 522 to produce on line 533 yet another modified binary video signal having a leading edge corresponding to that of the current binary video signal and a trailing edge corresponding to the last-to-occur of the trailing edges of the current and delayed signal.

The NAND gates in the herein described preferred embodiment can be, for example, Texas Instruments component SN74S00 and the NOR gates can be Texas Instruments component SN74S02 and the AND gates can be, for example, Texas Instrument component SN7408. The inverters can be Texas Instruments component SN74S04.

Figure 7:
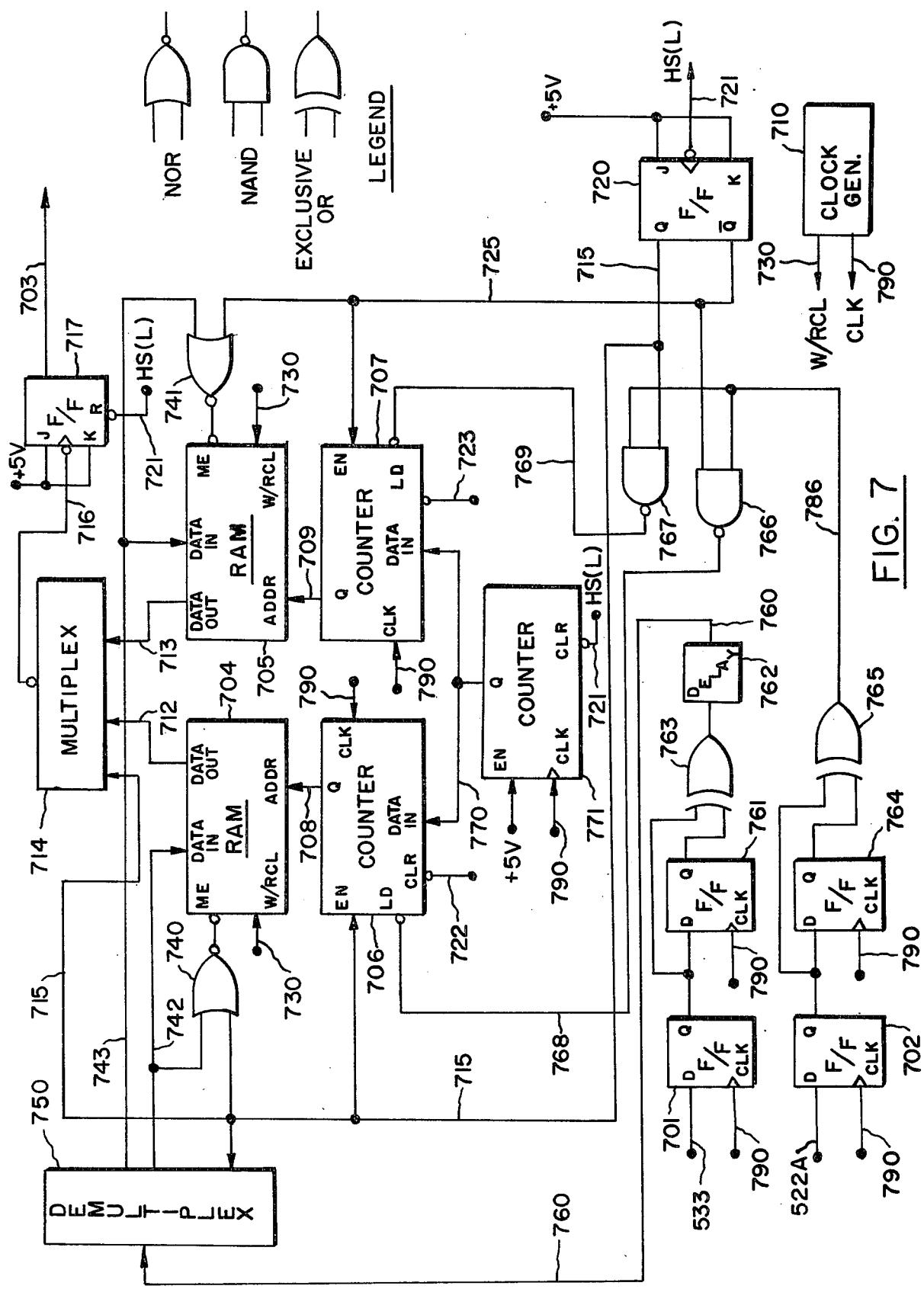
FIG. 7 shows a combined block and logic diagram of the memory circuit of FIG. 5.

The system of FIG. 7, which implements the functions of memroy 511, includes a pair of random access memories 704 and 705 which store the intercept data which is to be delayed one line scan and then employed to generate a delayed binary video signal. One memory is used to store such data for a current line scan while the data for the previous line scan is being outputted from the other memory to generate the delayed signal, and vice-versa. The switching of the memories from the input or store state to the output state is controlled by JK flip-flop 720 which switches its outputs responsive to the receipt of the line scan horizontal sync pulse via line 721. The flip-flop 720 can be, for example, Texas Instruments component SN74S74. Thus, when flip-flop 720 produces on line 715 a signal which is asserted high, or in the "1" state, it enables memory 704 via gate 740 to assume an output mode and output is stored data via line 712 to multiplexer 714 which can be, for example, Texas Instruments component SN74S157. At such time, the signal asserted by flip-flop 720 on line 725 will be low so as to enable memory 705 to assume a store mode via gate 741 and store data. Reversal of the state of the flip-flop 720 reverses the above modes.

A clock generator 710 generates reference clock signals using a crystal oscitlation, for example, Texas Instruments component SN74S124. The clock generates a standard clock signal CLK on line 790 and a memory read/write clock W/RCL on line 730.

The modified binary video input on line 533, which are the pulses generated by flip-flop 507/506 in FIG. 5, is processed by D-type flip-flop 701 synchronously with the clocking signal CLK to produce an output to the second D-type flip-flop 761. Outputs of both flip-flops 701 and 761 pass to EXCLUSIVE OR gate 763 and through delay 762 so that for any transition of the signal on line 533, a positive pulse occurs on line 760, whose duration is equal to the period of a CLK clock signal. The appropriate magnitude of these periods can be determined from integrated circuit application data, the speed of scan and the clock rate of clock generator 710. Flip-flops 701 and 761 can be Texas Instruments component SN74S74 and EXCLUSIVE OR gate 763 can be Texas Instruments component SN74S86.

This pulse then passes to data demultiplexer 750 which, under the control of flip-flop 720 via line 715, routes the pulse along lines 743 to random access memory 705, when line 715 is low. Thus, unity data appears on the data-in line of the memory 705, and also gate 741 passes this pulse to the ME (memory enable) line on memory 705 so that a true signal is stored at the location defined by the address lines 709 driven by the counter 707. The timing for these events can be readily ascertained, for example, from the data sheets for the memory component SN74S200 by Texas Instruments. The demultiplexer unit 750 can be made by appropriately connecting the inputs and outputs of two sections of a multiplexer such as Texas Instruments component SN74S157.

Counter 707 can be a group of three synchronous binary counters such as the Texas Instruments component SN74S163, connected in the manner suggested by the manufacturer at page 333 of "The TTL Data Book" published by Texas Instruments Incorporated, First Edition Copyright 1973. The address on line 709 from counter 707 is determined by the strobe signal on line 786. This signal is generated by passing the current binary video signal via line 522A to flip-flop 702, similar to flip-flop 701, which passes the incoming video signal to flip-flop 764 similar to flip-flop 761 and thence to EXCLUSIVE OR gate 765 similar to element 763, to produce on line 786 a positive pulse similar to that on line 760, whenever a transition occurs on line 522.

This positive pulse, if line 715 is high, will cause NAND gate 767 to produce a pulse into the load or LD terminal of counter 707 to load this counter synchronously with clock line 790 at CLK terminal with the contents of the data on the parallel data line 770, driven from counter 771 which can be similar in design to counter 707. Counter 771, which is reset or cleared by the horizontal sync pulse on line 721 at the beginning of each line, counts using clock CLK, an increasing count across the scan line, so that its contents at any instance can correspond to the X-position of the scanning spot along a horizontal scan line.

Thus, the address to which data is assigned in memory 705 corresponds to the time at which the last transition at a leading or trailing edge of the current video signal occurred on current video line 522, i.e., the last pulse on 786. If line 715 is low, line 769 is high. A similar operation would occur with memory 704, NOR gate 740, parallel data lines 708, counter 706, responding again to line 770, the counter 706 being set through NAND gate 766 and line 768.

In the output mode, assuming as before that line 715 is high, counter 706 is counting. Counter 706 is cleared at the beginning of a horizontal scan line by line 722, corresponding to the horizontal sync pulse on line 721. Thus, addresses, corresponding approximately to the X-coordinate of the scanning point, appear on line 708 for input into the address input of random access memory 704.

The memory 704 is enabled, by NOR gate 740 responding to the high or "1" signal at line 715. Consequently, the data-out line 712 produces a pulse whenever the address on line 708 addresses a cell or location within the memory, which is in the true, "1" or asserted state. This pulse on line 712 passes into data multiplexer 714, which is selected in response to line 715 to pass the data from input line 712 to output line 716. The pulse which occurs at each address location triggers flip-flop 717, to produce an output line 703 a pulse whose transitions occur at the time defined by the addresses of the true or "1" locations in memory 704 thereby generating a true binary signal. In order to ensure that the flip-flop 717 has a correct initial state at the beginning of each scan line, horizontal sync is fed into its reset terminal by line 721.

During the store mode for either memory, which is dependent upon flip-flop 720, only memory locations corresponding to those loaded into counter 707, or into the other counter 706 have entries made into them. Thus, other locations were left undisturbed. It consequently becomes a further responsibility of the output mode to write into every location which has been read, a zero ("0") or null data. This is done by virtue of the W/RCL line 730 generated by the clock generator 710. Therefore in the output mode, every read operation is followed by a write cycle, before address counter 706 is incremented. In order to ensure that this event occurs, data demultiplexer 750, in response to a high on line 715, ensures that data in line 722 is low and that zeroes ("0's") will be written into the memory 704. As will be appreciated, this read/write clocking requirement, when applied also is the store mode of the line-to-line memory circuit, does not unvalidate the operation of this mode and accordingly the W/RCL line 730 connects to both memories.

Whenever line 715 is low and line 725 is high, due to flip-flop 720 setting the state opposite to line 715, and memory 705 will be in the output mode. In such a mode, an input address data line 709, counter 707, NOR gate 741, and the counterparts of the other components hereinbefore discussed with rspect to memory 704, function similarly to those described for memory 704.

Referring again to FIG. 5, the output delayed video signal on line 703 from line-to-line memory 511, as described with respect to FIG. 7, passes through inverter 512 to gate 510. Gate 510 produces a pulse whenever the signal on line 703 is low or "0" and the signal on line 522 is low or "0", whichever is the latest, so that both have a level corresponding to the condition when the scanning spot is not traversing a feature. This causes flip-flop 507/506 to reset corresponding to the "last trailing edge of a feature" and in preparation for the next intercept which will produce a high level signal initially on line 522.

Whenever a negative transition "1" to "0" occurs on line 703, corresponding to the trailing edge of a feature, it passes through delay 513 into positive differentiator 516 to produce at the output of the positive differentiator 516, a positive pulse. The positive differentiator may be implemented using a singal resistor, a single capacitor and a single diode in a manner well known to those in the art.

Delay 508 receives the output of set/reset flip-flop 506/507 at gate 506, delays it for a significant time, which is greater than the time delay of delay 513 and passes it to NAND gate 515. The significant time approximates 1 or 2 clock pulses. Whenever the output from delay 508 is high, coincident with a positive pulse from differentiator 516, a low or "0" output occurs from NAND gate 515 and this corresponds to the generation of a count pulse.

The resulting pulse passes to NOR gate 517 where, with vertical sync pulses on line 525, it is ensured that count pulses from outside the field of view, are not able to pass or are inhibited. In the alternative, on line 525 there could be present the signal corresponding to a frame signal which is asserted inside the frame which defines the field of measurement, thereby ensuring that only counting pulses that occur within that frame or field of measurement are allowed to pass. In any event, those pulses which do not pass reach monostable 516 to produce an elongated pulse on line 130 which passes subsequently to a counter in data processor 407, as shown in FIG. 4 for generating a result on line 409 corresponding to the number of pulses generated in the field of view. This result passes to display 408, to display a count of the number of features in the field of view, as disclosed, for example, in the Morton U.S. Pat. No. 3,805,028.

In operation, the circuit of FIG. 7 on a specific feature, functions as follows. The video horizontal sync on line 721 clears counter 771 so that it can begin counting along the next scan line. During that line scan, current binary video transitions are converted into strobe signals on line 786, as hereinbefore explained. Upon occurrence of each strobe signal, the count then is counter 771, representing the X-coordinate of that particular transition, is loaded into either counter 706 or counter 707, dependent upon which is in the output mode. Further, provided there is a signal on line 760 corresponding to a transition of the modified binary video signal, it is loaded into either memory 704 or memory 705.

Thus referring to FIG. 2, when a transition occurs in the modified video signal, the count at points 1 and 4 will be loaded into memory from line *n* because they are the first and last intercept points and therefore are either in the counter 706 or counter 707.

Thus, there is provided means for generating and successively temporarily storing the X-coordinates of the intercepts of the scanning beam with a feature in the current line scan, as well as means for reading those X-coordinates, which are currently temporarily stored, in response to transitions of the modified video signal.

The operation of the circuit of FIG. 5 of this disclosure in the oversize count mode is similar to the operation of the circuit disclosed in FIG. 20 of the before-mentioned Morton patent. Signal inject unit 502 of FIG. 5 contains gates similar to 5802 and 5803 of FIG. 20 of the referred to Morton patent. An oversize count pulse enters on line 670 of FIG. 5, which is equivalent to line 6705 of FIG. 20 of the beforementioned Morton patent, and the signal on line 820, which is equivalent to 5820 of FIG. 20 of the Morton patent, inhibits passage of the binary video signal to inverter 505 and gate 509, when the delayed video is not asserted. In addition, in the oversize count mode, AND gate 540 is inserted to pass on the continuation of line 522A the current video signal to the line-to-line memory 511. It will be appreciated that in the count mode a direct connection is made from line 522 to line 522A.

Thus, no modified video signal will occur for a feature on line 533 until an oversize pulse first occurs on line 670. When such a pulse does occur, storage will occur in line-to-line memory 511 at X-coordinates corresponding to the current video signal.

On the next scan line the resulting delayed video on line 820 passes to line 522 to give a video signal corresponding to the full length of the previous intercept. As a result, storage data in line-to-line memory 511 will again correspond to a full length and current intercept.

Referring to the disclosure of FIG. 27 of the beforementioned Morton patent, the disclosed operation of the present invention results in a modified binary video on line 533 of FIG. 5, which corresponds to the shaded area of the feature of FIG. 27 except that the angle of the straight line starting at the point of the "first intercept accepted pulse" or first oversize pulse on line 670 will be horizontal and the line will be displaced downward by one scan line spacing. The benefits of this operation can be seen in FIG. 3 of this disclosure. Assuming an oversize count pulse first occurs at point 301 of feature 302, the stored binary signal when applied to the reset scan line will be asserted from point 303 to 304, thus producing a signal which overlaps the current video existing from point 305 to point 306 on line 311 and thereby ensuring that the feature does not break-up and produce multiple counts with individual counts from each projection.

Figure 3:
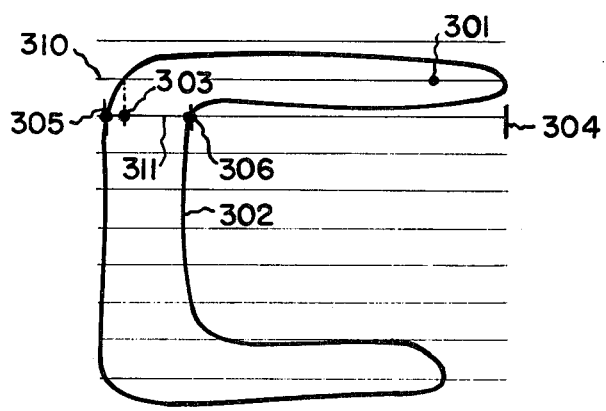
FIG. 3 is an illustration of a particle being scanned in oversize mode in accordance with this invention.

On features with extreme re-entrances, such as the one shown in FIG. 3, multiple counts could occur unless the paralysis angle is effectively zero.

It is claimed:

1. In an image analysis system for scanning a feature with an energy beam and providing a current binary video signal having leading and trailing edges corresponding to the leading and trailing edge intercepts of said beam with said feature, and for comparing a given line scan binary video signal, stored for one line scan after the given line scan, with the current binary video signal of the line scan following the given line scan to produce a modified binary video signal having a leading edge corresponding to that of said current binary video signal and a trailing edge corresponding to the last-to-occur of the trailing edges of said current and of said stored video signal, a device for reducing the paralysis angle of the scanned feature to essentially zero, comprising:

means for generating for successive current line scans and successively temporarily storing data corresponding to the X-coordinates of the intercepts of said beam with said feature for each successive current line scan;

means for successively reading those X-coordinates which are currently so temporarily stored and successively selecting, as a function of data derived from successive given and current scan lines, of those X-coordinates so read, for successively storing, data defining the leading edge and trailing edge of said feature; and means for generating successive said video signals stored for one line scan having values representing the leading and trailing edges corresponding in time to those of the successively selected X-coordinates.

2. In an image analysis system in which the video signal from each line scan of a feature is stored for at-least-one-line-scan and compared with the video signal from a following or current line scan of such feature, the improvement comprising:

means for generating a binary video signal having a leading edge value corresponding to the leading edge value of a current video signal and trailing edge value corresponding to the last-to-occur of the trailing edge values of the current binary video signal and a at-least-one-line stored modified video signal;

means for successively and temporarily storing the X-coordinate values of the intercepts of a current line scan of such feature;

means for retrieving those X-coordinates, which are currently so stored, of the leading and trailing edge values of said binary video signal occur; and means for generating said modified video signal with leading and trailing edge values corresponding in time to those of the retrieved X-coordinate values.

3. In an image analysis system having means for scanning a feature with an energy beam and providing a current binary video signal having leading and trailing edge values corresponding to the leading and trailing edge intercepts of said beam with said feature, and also having means for delaying a modified binary video signal for one line scan and comparing it with the current binary video signal of the next line scan to produce a second binary video signal having a leading edge value corresponding to that value of said current binary video signal and a trailing edge value corresponding to the last-to-occur of the trailing edges of said current and of said delayed modified video signals, the improvement for providing said modified signal in such a manner to reduce the paralysis angle of the scanned feature to essentially zero, comprising:

means for generating and successively temporarily storing data representing the X-coordinates of the intercepts of said beam with said feature for a current line scan;

means for reading the X-coordinate data which is currently so temporarily stored and storing, as a function data derived from the current binary video signal and the delayed modified binary video signal of that X-coordinate data so read, data defining the leading and trailing edge values of said modified binary video signal; and means for generating said delayed modified video signal with leading and trailing edge values corresponding in time to those of the X-coordinates of the stored data of the modified binary video signal.

4. In an image analysis system having means for scanning a field of features with an energy beam and providing a current binary video signal representative of the intersection of said beam with the leading and trailing edges of the features, the improvement in combination therewith of:

means for generating X-coordinate data representative of the leading and trailing edge intersects of at least two depending portions of a single reentrant feature along the scan line;

memory means for storing said intersect data for one line scan;

means for selecting the data of the first leading edge intersect and the data of the last trailing edge intersect on a scan line traversing said single feature from data corresponding to any other edge intersect for such feature on such scan line;

means responsive to said selected data for generating a binary signal stored for one line scan representative of said selected intersect data; and means for comparing the current and one line scan stored video signals and for generating a count signal responsive to the absence of one of said video signals.

5. In an image analysis system having means for scanning a feature with an energy beam and providing a current binary video signal having leading and trailing edge data corresponding to the leading and trailing edge intercepts of said beam with said feature, and also having means for delaying a modified binary video signal for one line scan and comparing it with the current binary video signal of the next line scan to produce a second binary video signal having a leading edge value corresponding to that of said current binary video signal and a trailing edge value corresponding to the last-to-occur of the trailing edge values of said current and of said delayed modified video signals, the improvement for providing said modified signal in such a manner to reduce the paralysis angle of the scanned feature to essentially zero, comprising:

means for generating and successively temporarily storing X-coordinate data of the intercepts of said beam with said feature for a current line scan;

means for reading the X-coordinate data which is currently so temporarily stored and storing, as a function data derived from the current binary video signal and the delayed modified binary video signal of the X-coordinate data so read, data defining the leading and trailing edge values of said modified binary video signal; and means for generating said delayed modified video signal with leading and trailing edge values corresponding in time to those representing the X-coordinates of the stored data of the modified binary video signal.

6. An apparatus for analyzing an image of at least one feature by generating feature continuity comparison signals for features analysis from image data substantially within the image boundary of each respective feature, comprising:

scanning means for line scanning the feature image to generate a first video signal defining leading and trailing edge intercepts of the feature image with the line of scan;

data generating means for generating positional data defining a coordinate along the scan line for the leading and trailing edge intercepts of the feature image;

data storage means for temporarily storing the positional data defining the coordinate locations of the feature image intercepts;

selection means for selecting from the temporarily stored data, data representing the coordinate locations of the first leading edge intercept and the last trailing edge intercept of the feature image along the line of scan;

signal generating means for generating a delayed video signal corresponding to the selected data;

comparison means for comparing the delayed video signal with a video signal of a current line of scan; and modification means for generating a modified video signal having a leading edge value corresponding to that of the current video signal and a trailing edge value corresponding to the last-to-occur of the trailing edge values of the delayed video signal and the current video signal of the feature image.

7. A method of analyzing an image of one or more features in a manner that any paralysis angle of the feature is essentially zero, comprising the steps of:

line scanning a feature having a plurality of each of leading and trailing edge intercepts along a single scan line;

generating positional data representative of the X-coordinates of said intercepts along a line of scan;

temporarily storing the positional data representative of the X-coordinates of said intercepts;

selecting from said temporarily stored data that data which represents the positions of the first leading and last trailing edge intercepts;

generating a video signal corresponding to the selected data;

delaying such video signal; and comparing such delayed video signal with a video signal of a succeeding line scan of the feature to provide a modified video signal having a trailing edge corresponding to the last-to-occur of the trailing edges of the delayed video signal and the video signal of the succeeding line of scan.

8. The method of claim 7, wherein the step of delaying the video signal is carried out to delay said video signal one line scan.

9. The method of claim 8, wherein the step of comparing the signal is carried out by comparing it to the video signal of the next line scan of the feature.

10. A method of analyzing an image of a feature in a manner that the paralysis angle of the feature is essentially zero, comprising the steps of:

line scanning the feature to generate a first video signal defining leading and trailing edge intercepts of the feature;

generating positional data defining the X-coordinates of said intercepts;

temporarily storing positional data defining the X-coordinates of said intercepts;

selecting from said temporarily stored data, data representing the positions of the first leading edge intercept and the last trailing edge intercept of the feature along a line of scan;

generating a delayed video signal corresponding to the selected data;

comparing the delayed video signal with a video signal of a current line scan; and generating a modified video signal having a leading edge value corresponding to that of the current video signal and a trailing edge value corresponding to the last-to-occur of the trailing edge values of the delayed video signal and the current video signal.

11. A method of analyzing two features by raster line scanning an image of the two features which are disposed to have at least one common horizontal line of scan traversing each feature and one of two separate horizontal lines of scan traversing the first feature and the second of the separate horizontal lines of scan traversing the second feature at locations in the raster pattern on the respective features which are vertically aligned, comprising the steps of:

line scanning the first feature having at least one leading and at least one trailing edge intersection along a single horizontal scan line;

generating raster pattern positional data representative of the locations of intersections along the horizontal scan line for the first feature;

storing the positional data representative of the locations of the intersections of the first feature;

selecting from the stored data that data which represents raster pattern positions of the first leading and trailing edge intersections of the first feature;

generating a video signal corresponding to the selected data of the first feature;

delaying such video signal corresponding to the first feature;

comparing such delayed video signal with a video signal of a succeeding horizontal line of scan of said first feature to provide a modified video signal having a trailing edge value corresponding to the last-to-occur of the trailing edge values of said delayed video signal and the video signal of the succeeding line of scan;

line scanning the second feature to generate video signals representative of the feature; and processing the video signals for feature analysis of each respective feature.

* * * * *

UNITED STATES PATENT AND TRADEMARK OFFICE
CERTIFICATE OF CORRECTION

PATENT NO. : 4,069,411

DATED : January 17, 1978

INVENTOR(S) : Roger R. Morton

It is certified that error appears in the above-identified patent and that said Letters Patent are hereby corrected as shown below:

Col. 1, line 68, delete "tranversed" and substitute therefore --traversed--.

Col. 6, line 32, after "line" delete "on" and substitute therefore --of--.

Col. 7, line 50, after "also" delete "is" and substitute therefore --in--.

Col. 7, line 51, delete "unvalidate" and substitute therefore --invalidate--.

Col. 8, line 10, before "resistor" delete "singal" and substitute therefore --single--; and line 46, before "counter" delete "is" and substitute therefore --in--.

Signed and Sealed this

Sixteenth Day of May 1978

[SEAL]

Attest:

RUTH C. MASON
Attesting Officer

LUTRELLE F. PARKER
Acting Commissioner of Patents and Trademarks